United States Patent
Braundmeier et al.

(10) Patent No.: US 10,331,507 B2
(45) Date of Patent: Jun. 25, 2019

(54) SYSTEMS AND METHODS FOR REAL TIME COMPUTER FAULT EVALUATION

(71) Applicant: MasterCard International Incorporated, Purchase, NY (US)

(72) Inventors: Aaron Braundmeier, St. Peters, MO (US); Brian Marsh, St. Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 198 days.

(21) Appl. No.: 15/387,171

(22) Filed: Dec. 21, 2016

(65) Prior Publication Data

US 2018/0173583 A1 Jun. 21, 2018

(51) Int. Cl.
*G06F 11/07* (2006.01)
*G06F 11/34* (2006.01)

(52) U.S. Cl.
CPC ........ *G06F 11/0754* (2013.01); *G06F 11/079* (2013.01); *G06F 11/0781* (2013.01); *G06F 11/0793* (2013.01); *G06F 11/3476* (2013.01); *G06F 2201/805* (2013.01); *G06F 2201/81* (2013.01)

(58) Field of Classification Search
CPC . G06F 11/0766; G06F 11/079; G06F 11/0793
USPC .......................................................... 714/37
See application file for complete search history.

(56) References Cited

U.S. PATENT DOCUMENTS

| | | | |
|---|---|---|---|
| 6,598,179 B1 * | 7/2003 | Chirashnya | G06F 11/079 714/19 |
| 7,251,754 B2 | 7/2007 | Maxwell | |
| 7,484,132 B2 | 1/2009 | Garbow | |
| 7,539,907 B1 | 5/2009 | Johnsen et al. | |
| 7,761,745 B2 | 7/2010 | Garbow | |
| 8,533,537 B2 | 9/2013 | Nemecek et al. | |
| 8,661,130 B2 | 2/2014 | Sonoda et al. | |
| 8,862,948 B1 | 10/2014 | Lam | |
| 9,450,833 B2 | 9/2016 | Griffith et al. | |
| 2005/0015685 A1 * | 1/2005 | Yamamoto | G06F 11/0727 714/54 |

(Continued)

OTHER PUBLICATIONS

PCT International Search Report and Written Opinion, Application No. PCT/US2017/064153, dated Mar. 5, 2018, 19 pps.

*Primary Examiner* — Chae M Ko
(74) *Attorney, Agent, or Firm* — Armstrong Teasdale LLP (57) ABSTRACT

A method of evaluating real-time computer faults and using a fault evaluation (FE) platform is provided. The method includes ingesting log data associated with a computer system, the log data includes a plurality of fault events, a fault severity identifier associated with at least one fault event of the plurality of fault events. The method also includes selecting, from the plurality of fault events, a fault event set which corresponds to a time window and includes the at least one fault event. The method further includes generating a fault score for the at least one fault event and an aggregate fault score. The method also includes determining that the aggregate fault score exceeds a predefined threshold, and providing, to a configuration management platform, instructions to initiate a hardware component remediation process.

17 Claims, 5 Drawing Sheets

(56) References Cited

U.S. PATENT DOCUMENTS

| | | | |
|---|---|---|---|
| 2005/0076113 A1* | 4/2005 | Klotz | H04L 41/12 709/224 |
| 2005/0193271 A1* | 9/2005 | Linam | G06F 9/4812 714/39 |
| 2007/0271276 A1* | 11/2007 | Allen | G06Q 10/06 |
| 2008/0250265 A1* | 10/2008 | Chang | G06F 11/008 714/4.12 |
| 2009/0204845 A1* | 8/2009 | Herscovitz | H04W 88/02 714/2 |
| 2011/0060948 A1* | 3/2011 | Beebe | H04L 43/16 714/37 |
| 2011/0138219 A1* | 6/2011 | Walton | G06F 11/0712 714/3 |
| 2011/0191394 A1* | 8/2011 | Winteregg | G06F 17/30 707/822 |
| 2011/0264964 A1* | 10/2011 | Murphy | G06F 11/0709 714/48 |
| 2014/0068329 A1 | 3/2014 | Hopper et al. | |
| 2014/0344622 A1 | 11/2014 | Huang et al. | |
| 2015/0271008 A1* | 9/2015 | Jain | H04L 41/0686 714/57 |
| 2015/0293800 A1* | 10/2015 | Shivanna | G06F 11/0748 714/37 |
| 2016/0277260 A1 | 9/2016 | Griffith et al. | |
| 2016/0306675 A1 | 10/2016 | Wiggers et al. | |

\* cited by examiner

SYSTEMS AND METHODS FOR REAL TIME COMPUTER FAULT EVALUATION

BACKGROUND

This disclosure relates to real-time evaluation of computer faults occurring within computer components. More specifically, the disclosure relates to detecting and evaluating computer faults in order to determine remediation actions for an affected computer component.

Networked computing environments frequently employ a large number of computer components, such as hardware components. Such computer components perform a myriad of complex tasks using large amounts of data in networked configurations with multiple other computer components. In some cases, computer component activity is logged and generates log data. Investigating component failures and other performance problems, sometimes also referred to as faults, requires log data analysis. The volume and intricacy of log data grows proportionally relative to the size of the computing environment, challenging the ability of many organizations to effectively investigate and cure computer component faults. Manual analysis of such detailed log data can quickly become cumbersome or even impossible to accomplish. The sheer amount of log data can tax even a computer's ability to quickly sort, search, or filter log data for a technician to determine the fault.

In many known systems, computer component faults are often investigated once they have already occurred. In many cases, these known systems only allow faults to be investigated once undesirable consequences have occurred, such as performance slowdown or data loss. Some known methods may allow for searching or filtering through log data (e.g., log files) that may be quicker than manual searching. However, these known systems are also limited in that they are unable to prevent a fault before it occurs. These known systems are also unable to efficiently reallocate computer tasks away from the affected computer component in the event a fault occurs, causing additional downtime and requiring manual intervention to restart the failed tasks using another computer component. These known systems are further limited in their inability to accurately identify a suitable replacement for the failed computer component, leading to further downtime and a manual search for a replacement. These known systems are still further limited in that they are unable to evaluate a current fault using preceding faults in way that may provide useful data regarding the severity of potential consequences relating to the current fault.

Many computing environments employ a variety of virtual machines that are managed by a virtual machine manager or hypervisor. One hardware component, such as a blade server, may host multiple virtual machines. Each hosted virtual machine will need to be migrated to another blade server in the event of a hardware fault (e.g., memory faults, cable or wire problems, overheating, power loss, faulty motherboards, or the like). The known virtual systems are unable to detect the initial warning signs of an impending hardware fault until at least a performance slowdown has occurred.

Accordingly, there is a need for more effective systems for evaluating faults to prevent fault occurrences and proactively initiate remediation for affected computer components.

BRIEF DESCRIPTION

In one embodiment, a method of real-time computer fault evaluation for a computer system and using a fault evaluation (FE) platform. The method includes ingesting log data associated with a computer system wherein the log data includes a plurality of fault events, a fault severity identifier being associated with at least one fault event of the plurality of fault events. The method also includes selecting, from the plurality of fault events, a fault event set wherein the fault event set corresponds to a time window and includes the at least one fault event. The method further includes generating a fault score for the at least one fault event and an aggregate fault score. The method also includes determining that the aggregate fault score exceeds a predefined threshold, and providing, to a configuration management platform, instructions to initiate a hardware component remediation process.

In another embodiment, a system for real-time computer fault evaluation for a computer system includes a fault evaluation (FE) platform. The FE platform is configured to ingest log data associated with the computer system wherein the log data includes a plurality of fault events, a fault severity identifier being associated with at least one fault event of the plurality of fault events. The FE platform is also configured to select, from the plurality of fault events, a fault event set wherein the fault event set corresponds to a time window and includes the at least one fault event. The FE platform is further configured to generate a fault score for the at least one fault event and an aggregate fault score. The FE platform is also configured to determine that the aggregate fault score exceeds a predefined threshold, and to provide, to a configuration management platform, instructions to initiate a hardware component remediation process.

In yet another embodiment, a non-transitory computer readable medium has computer executable instructions for real-time computer fault evaluation for a computer system, wherein when executed by a fault evaluation (FE) platform comprising a processor, the computer executable instructions cause the FE platform to ingest log data associated with the computer system wherein the log data includes a plurality of fault events, a fault severity identifier being associated with at least one fault event of the plurality of fault events. The computer executable instructions also cause the FE platform to select, from the plurality of fault events, a fault event set wherein the fault event set corresponds to a time window and includes the at least one fault event. The computer executable instructions further cause the FE platform to generate a fault score for the at least one fault event and an aggregate fault score. The computer executable instructions also cause the FE platform to determine that the aggregate fault score exceeds a predefined threshold, and to provide, to a configuration management platform, instructions to initiate a hardware component remediation process.

BRIEF DESCRIPTION OF THE DRAWINGS

FIGS. 1-5 show example embodiments of the methods and systems described herein.

Like numbers in the Figures indicate the same or functionally similar components.

DETAILED DESCRIPTION

The present disclosure relates to systems and methods for real time computer fault evaluation. More specifically, the systems described herein include a fault evaluation (FE) platform that is configured to receive real time log data for a computer component, apply an algorithm to continuously generate a fault score for that component, determine if the fault score exceeds a threshold and, if so, cause the initiation of an automated remediation process for that computer component before a critical failure occurs.

In one embodiment, the platform evaluates a plurality of fault events preceding a particular fault event. This enables the FE platform to generate a fault score that, compared to an analysis of just a single fault event, more accurately represents the state of the component. For example, a critical fault event preceded by a number of minor fault events may signify less impending performance impact to a component as compared to a minor fault event in the immediate time frame preceded by or bookended by a large number of critical fault events. The FE platform is configured to evaluate random fault events (e.g., including sequence of events, time duration of events, and types of events) based on an analysis of past sequences, time durations, and/or types of fault events in order to more accurately predict the degree of performance impact and thus initiate an appropriate remediation process.

In at least some implementations, the FE platform is connected to computer components (e.g., those logging data and experiencing faults). The FE platform may receive this data via a log data service. The FE platform is also connected to an automation toolset (AT) platform, also referred to herein as a configuration management platform. In one embodiment, the FE platform is connected to the AT platform via a message broker platform. The FE platform transmits fault scores, service profile data, and remediation recommendations to the AT platform for processing. In an alternative embodiment, The FE platform, the message broker platform, and the AT platform may be connected in a single computer device.

In at least some implementations, computer components operate using a service profile. A service profile may be a data file, data table, memory location or the like. The service profile includes information such as component definition data, identity data, firmware revision data, connectivity definition data, and the like. Component definition may include, in the case of a hardware component, data regarding the hardware component model, compatible components, performance data, and the like. Identity data includes specific identifiers for the component such as universally unique identifier(s) (UUID), media access control (MAC) address, world-wide name (WWN) data, and the like. Firmware revision data includes data regarding the current firmware version for the component, revision schedules, and the like. Connectivity definition data is usable to configure network adapters, interconnecting components, and the like.

Computer components perform a large variety and quantity of individual tasks. During operation, each individual task or function may be logged by logger or monitor programs that log events generated by the component (e.g., a performance monitor). In at least some implementations, a log data service is installed on or runs in conjunction with each computer component. The log data service may be a software program configured to collect, aggregate, and communicate log data generated by the loggers/monitors. The log data service is further configured to communicate the aggregated log data to a connected device such as the FE platform.

During operation, a computer component may encounter an undesirable or abnormal event, also referred to herein as a fault event. For example, a memory component on a server may fail to store data in the correct memory location, not store it at all, or simply become unresponsive. A central processing unit may enter an error state where it cannot process further instructions. A networking component may exhibit signs of faulty communication (e.g., data is intermittently received or out of expected order) or simply cease sending or receiving data. External factors such as component overheating, electricity fluctuations, and human error may also cause well-performing components to enter fault states. Serious faults are sometimes preceded by progressive declines in performance (e.g., a network card may exhibit signs of increasingly slower data communication before it shuts down completely). In at least some implementations, a logger program records the fault event in a log data file or table when the fault event occurs. The logger is configured to record the nature and severity of the fault event. Each fault event is assigned a fault severity identifier. An example of a fault event is provided below in Table 1 below. Fault severity identifiers and their descriptions are provided in Table 2 below.

TABLE 1

| Log Name | System |
|---|---|
| Source | NETLOGON |
| Date | Aug. 2, 2016 9:42:18 PM |
| Event ID | 5719 |
| Level | Warning |
| User | N/A |
| Computer | ST-LT-HP-1234.abc.com |
| Description | This computer was not able to set up a secure session with a domain controller in domain ABC. |

TABLE 2

| Severity | Description |
|---|---|
| Cleared | A notification that the condition that caused the fault has been resolved, and the fault has been cleared. |
| Info | A basic notification or informational message. Possibly insignificant. |
| Condition | An informational message about a condition, possibly insignificant. |
| Warning | A potential or impending service-affecting fault that currently has no significant effects in the system. Action should be taken to further diagnose, and correct the problem to prevent it from becoming a more serious service-affecting fault. |
| Minor | A non-service-affecting fault condition that requires corrective action to prevent a more serious fault from occurring. This severity could indicate that the detected alarm condition is not currently degrading the capacity of the managed object. |
| Major | A service-affecting condition that requires urgent corrective action. Could indicate a severe degradation in the capability of the managed object and that its full capability must be restored. |

TABLE 2-continued

| Severity | Description |
|---|---|
| Critical | A service-affecting condition that requires immediate corrective action. For example. this severity could indicate that the managed object is out of service and its capability must be restored. |

It will be appreciated by those having skill in the art that fault severity may be recorded and measured using the above classification or any other classification or even some combination of more than one classification. Fault severity may be represented using letters, numbers, symbols, colors, sounds, and the like. Any combination of these classifications may be used. In one embodiment, the FE platform is configured to assign a numeric value to the above-described fault severity identifiers (e.g., Cleared=0, Info=1, Condition=2, Warning=3, and so on).

The FE platform is configured to continuously generate a fault score for a computer component based on the received log data. In one embodiment, the FE platform ingests log data for a computer component (e.g., a computer server), where the log data includes a number of events including fault events. Each fault event has a fault severity identifier associated with it, such as the fault severity identifiers illustrated in Table 1 above. Each fault event will also have a timestamp associated with it. As described above, the computer component also has a service profile that includes various types of data associated with the operation of the computer component.

While receiving the log data, the FE platform is configured to partition the log data into discrete time intervals. The FE platform may take the received minutes of log data for a computer component and partition it into 5-minute time intervals, for example. As time passes, the FE platform is configured to shift forward the time interval or time window for which the FE platform evaluates fault events. For example the time interval may be 10:00:00-10:05:00, then 10:00:01-10:05:01, and so on. The FE platform is configured to determine the severity of fault events for each fault event and also calculate the severity of each fault event in the time interval. For example, the FE platform may determine that in the first time interval (i.e., "10:00:00-10:05:00"), there were five fault events A, B, C, D, and E, with severities of A: Critical, B: Info, C: Critical, D: Critical, and E: Minor. The FE platform may further interpret the fault severity of Critical fault events with a numeric value of 7, of Minor fault events with a numeric value of 5, and of Info fault events with a numeric value of 1. Using such a classification, the fault severities during that five-minute time interval would be 7, 1, 7, 7, and 5.

Each fault event has its own assigned fault severity identifier (or incoming fault severity identifier). To determine the fault score for each fault, the FE platform combines the incoming fault severity identifier for a fault event with the fault severity identifiers for preceding fault events within the time interval to generate the fault score for the fault event. For example, the above fault event D has an incoming fault severity identifier of Critical, which is interpreted to have a numeric value of 7. The fault severity identifiers of the preceding fault events A, B, and C will be accumulated together with fault event D in order to generate the fault score for fault event D. In one embodiment, the FE platform uses the following equation to determine the fault score:

$$FS(a)=x\cdot((\text{Cleared})+(\text{Info})+(\text{Condition})+(\text{Warning})\dots)$$

where a is an incoming fault event, FS(a) is the fault score for fault event a, x is the fault severity identifier for the incoming fault event (e.g., Critical or 7 in the aforementioned example), and x is multiplied by a sum of the product of the number of preceding faults with their corresponding severity. Using the abovementioned example, the fault score for fault event D would be $FS(D)=7\cdot(1(1)+2(7))=98$. Accordingly, fault event D is assigned a fault score of 98 and the FE platform determines the next fault event score, which would be $FS(E)=5\cdot(1(1)+3(7))=110$.

Some events may not allow the FE platform to identify the fault events preceding a particular fault event. For example, the aggregate counter may be reset either by manual reset after remediation or by reset and/or restart of the server. In such events, the FE platform evaluates each fault event in the fault event set using an aggregate fault score. For example, the fault score for fault event D is calculated by accumulating together with fault event D the fault severity identifiers of the preceding fault events A, B, and C, and non-preceding event E from the time interval under consideration. Accordingly, the fault score for fault event D would be $FS(D)=7\cdot(1(1)+2(7)+1(5))=140$.

In one embodiment, the FE platform is further configured to generate an aggregate fault score for the component, not just for a fault event on the component. In another embodiment, the FE platform generates the aggregate fault score using the time interval corresponding to the fault event set. In yet another embodiment, the FE platform generates the aggregate fault score using a different time period (e.g., the entire time the component has been in operation). The threshold values may be varied according to the time period being used. Accordingly, the FE platform aggregates all fault scores for the component using the equation below:

$$FS(\text{component})=(FS(i))$$

where FS(i) is all faults currently present on the component.

In one embodiment, the FE platform is configured to compare the fault score for each fault event against a threshold value. The threshold value may be predefined by a user as a static value, or a dynamically changing value informed by various circumstances such as anticipated processing load for a component. When the fault score for a fault event exceeds the threshold value, the FE platform is configured to initiate a component remediation process. For example, the score for fault event E of 110 may exceed the threshold value that is set to be 100. In one embodiment, the FE platform initiates the component remediation process by signaling to the AT platform that the component needs to be decommissioned from active service while the source of the faults is investigated.

In a related embodiment, the FE platform analyzes the service profile of the affected component and further refines the determined fault score based on the service profile. For example, a Component 1 and a Component 2 both encounter a series of Critical faults that generate a fault score that exceeds the threshold value. However, Component 1 is a business-critical website server that requires constant uptime in order to maintain web pages for a website that handles substantial, round-the-clock website traffic. Component 2 is an internal storage server storing a handful of redundant files (e.g., application installation log files). The FE platform may determine, based on the service profile, that Component 1 performs more critical functions than Component 2. The FE platform may determine that a fault score of 90 for a fault event on Component 1 requires preferential attention than a fault score of 110 on Component 2. For example, the FE platform may add a further multiplier or add-on value to fault events on Component 1 in order to preferentially address fault events on Component 1.

In one embodiment, the FE platform communicates to the AT platform that, based on the evaluated fault score, severe performance impact the computer component is imminent. The AT platform is configured to receive this communication and initiate a remediation process whereby the service profile for the affected computer component is migrated to a similar, unaffected computer component. In a related embodiment, the FE platform may provide the AT platform with a service profile identifier for the relevant service profile. The AT platform may use the provided service profile identifier to download the service profile from a service profile repository. Once the new computer component is operational with the relevant service profile, the affected computer component may be removed from the component computer network or otherwise removed from operation.

In one embodiment, the FE platform analyzes the service profile to determine one or more functionalities that the affected component was configured to perform. The FE platform determines these functionalities and recommends specific replacement components for the AT platform to use in replacing the affected component.

The technical problems addressed by this system include at least one of: (i) inability of known systems to prevent a component fault before it occurs, (ii) inability of known systems to identify a replacement component once a fault score exceeds a threshold value, (iii) the occurrence of critical "showstopper" faults which provide warning signs before they occur but the warning signs are not properly interpreted, and (iv) problems caused by components failing and causing increased load on other components while a replacement is found.

The methods and systems described herein may be implemented using computer programming or engineering techniques including computer software, firmware, hardware, or any combination or subset thereof, wherein the technical effects may be achieved TBD.

The resulting technical benefits achieved by this system include at least one of: (i) ability to prevent component faults before they occur, (ii) ability to replace affected components without experiencing downtime, (iii) prioritization of components to replace based on algorithm that accounts for service profile in determining remediation process, and (iv) additional savings because specialized software previously used to detect faults after the fact is no longer required.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1:
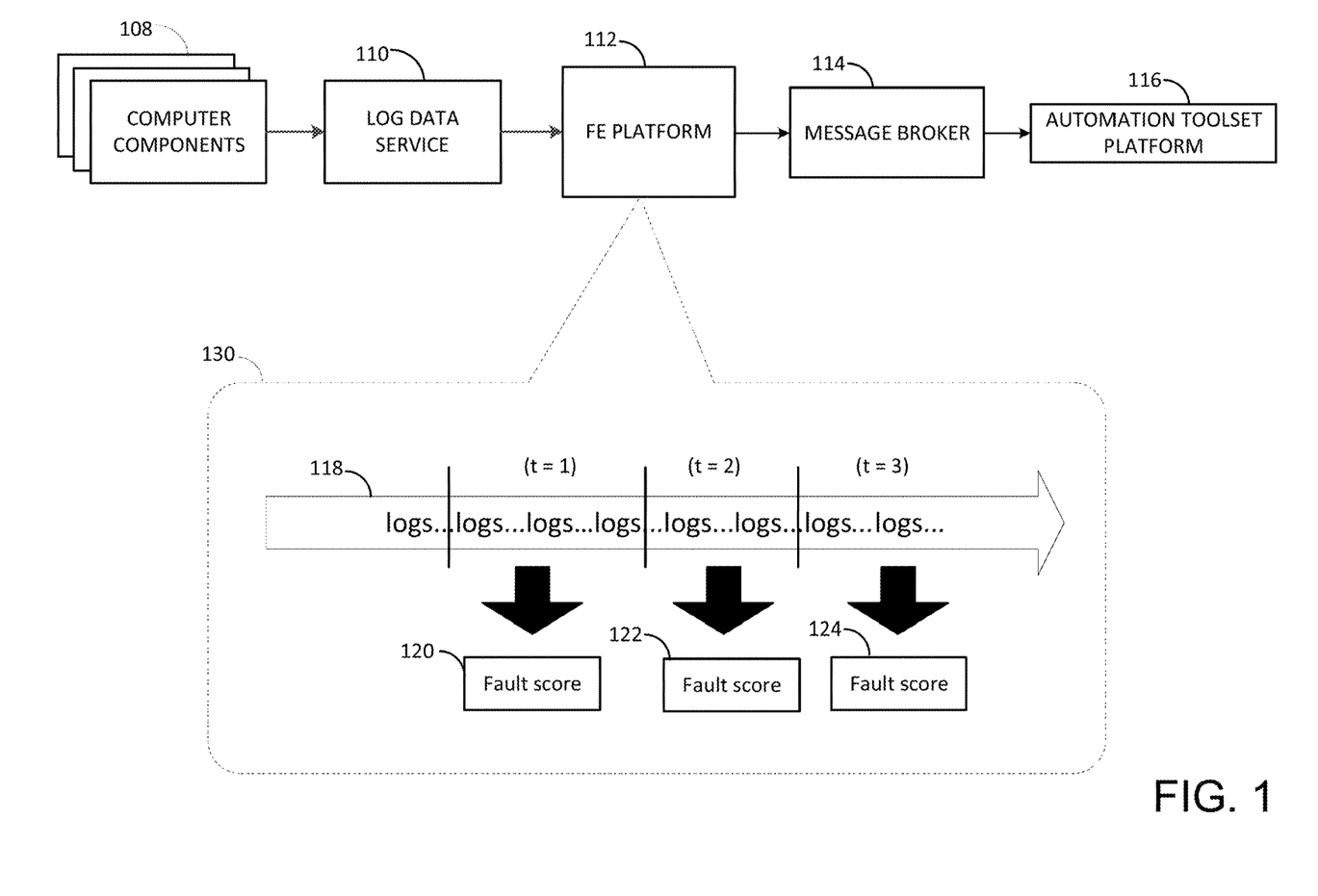
FIG. 1 shows an example message flow by which a fault evaluation (FE) platform establishes filesystem-based networking for computer applications.

FIG. 1 shows an example data flow diagram showing how the FE platform receives log data and evaluates fault events. As shown, a plurality of computer components 108 are connected to a log data service 110. Log data service 110 is communicatively coupled to fault evaluation (FE) platform 112. FE platform 112 is further communicatively coupled to automation toolset (AT) platform. In one embodiment, FE platform 112 connects to AT platform 116 via a message broker platform 114. FIG. 1 also shows an inset view 130 modeling the operation of FE platform 112.

In one embodiment, components 108 generate log data. Log data is collected and aggregated by log data service 110. Log data service provides the log data to FE platform 112. FE platform 112 receives log data and generates fault scores for each fault event for each component in components 108. As shown in view 130, log data 118 is partitioned into discrete time intervals that shift forward as time passes. For each time interval (or time window) a fault event is selected. The fault severity identifier for the fault event and for the preceding fault events in the time interval is analyzed via an algorithm to generate a fault score for that fault event. Accordingly, fault scores 120, 122, and 124 are generated for fault events within log data 118, as shown in FIG. 1.

FE platform 112 is also configured to compare the generated fault score for a fault event against a threshold. In one embodiment, a user of FE platform 112 will define the time interval and fault score threshold for FE platform 112 to use. The threshold may vary based on the specific time of observation, the type of component, component usage, or any other factor bearing on fault evaluation for the component. When a fault score exceeds the predefined threshold, FE platform 112 is configured to identify the component from components 108 that encountered the fault event whose score exceeded the threshold. FE platform 112 is configured to contact AT platform 116 (via message broker platform 114) and notify AT platform of the component and the fault score. In one embodiment, FE platform 112 provides the service profile of the affected component to AT platform 116 as well.

AT platform 116 is configured to initiate a remediation process for the affected component. In one embodiment, AT platform 116 is configured to use the received service profile and determine an alternate component that can replace the affected component without an interruption in performance or service. AT platform is configured to identify a replacement component, import the service profile onto the replacement component, migrate all traffic to the replacement component, and decommission the affected component. The decommissioned component is then investigated offline for the source of the fault in order to perform repairs.

Figure 2:
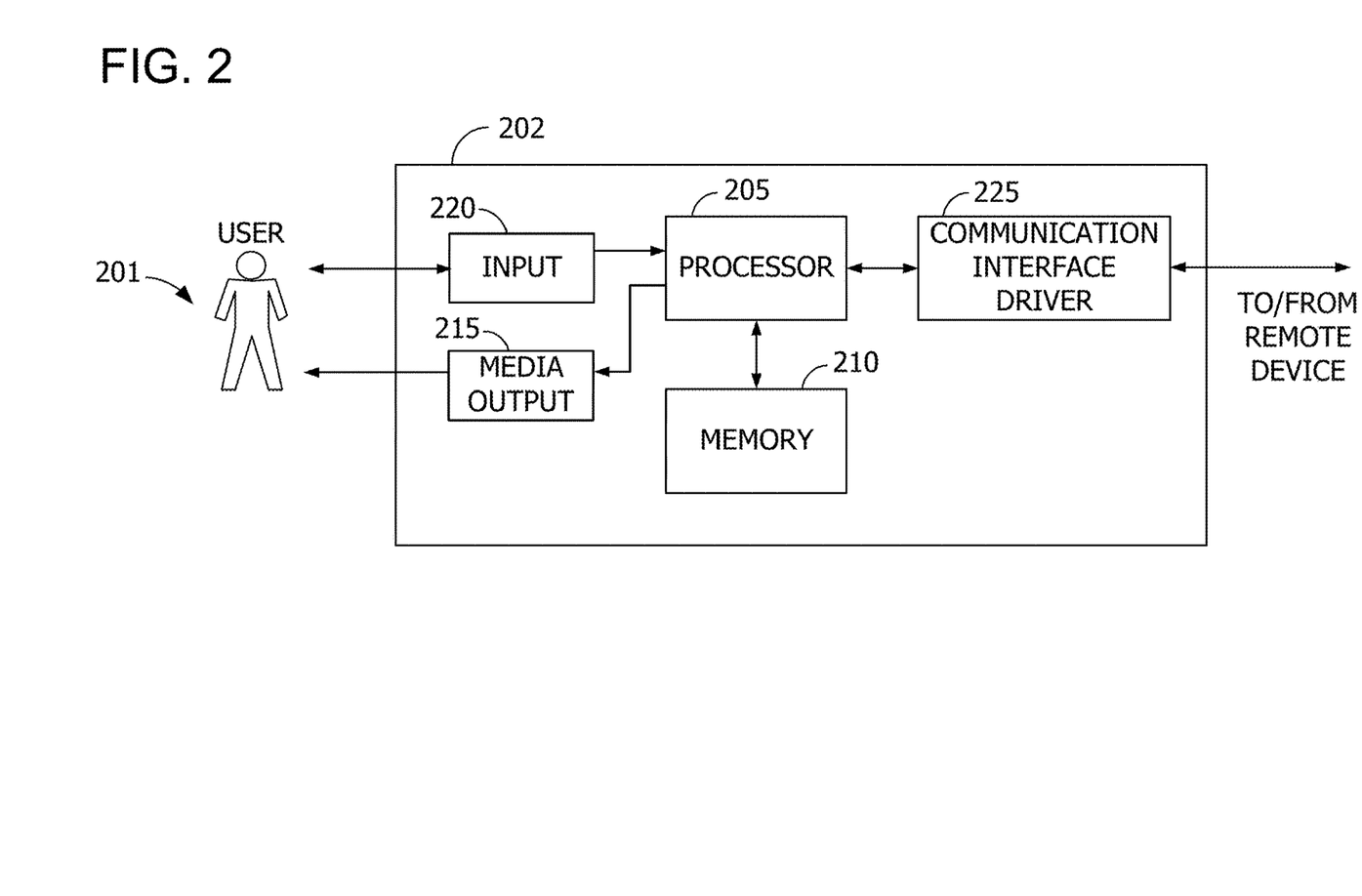
FIG. 2 illustrates an example configuration of a computer device that interoperates with the FE platform in a filesystem-based application network.

FIG. 2 illustrates an example configuration of a computer device that interoperates with FE platform 112 to facilitate functions of FE platform 112 during the fault evaluation and fault scoring process. Computer device 202 may be associated with a user who remotely connects to FE platform 112 in order to provide configuration information such as threshold values and time interval definitions for fault scoring. In the example embodiment, computer device 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

Computer device 202 also includes at least one media output component 215 for presenting information to user 201. Media output component 215 is any component capable of conveying information to user 201. For example, media output component 215 may be a display component configured to display application data to user 201. In some embodiments, media output component 215 includes an output adapter such as a video adapter and/or an audio adapter. An output adapter is operatively coupled to processor 205 and operatively connectable to an output device such as a display device, a liquid crystal display (LCD), organic light emitting diode (OLED) display, or "electronic ink" display, or an audio output device, a speaker or headphones.

In some embodiments, computer device 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. Computer device 202 may also include a Communication interface driver 225, which is communicatively connectable to a remote device such as Server system 112. Communication interface driver 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX). Stored in memory area 210 are, for example, computer readable instructions for providing a user interface to user 201 via media output component 215 and, optionally, receiving and processing input from input device 220. A user interface may include, among other possibilities, a web browser and computer application.

Figure 3:
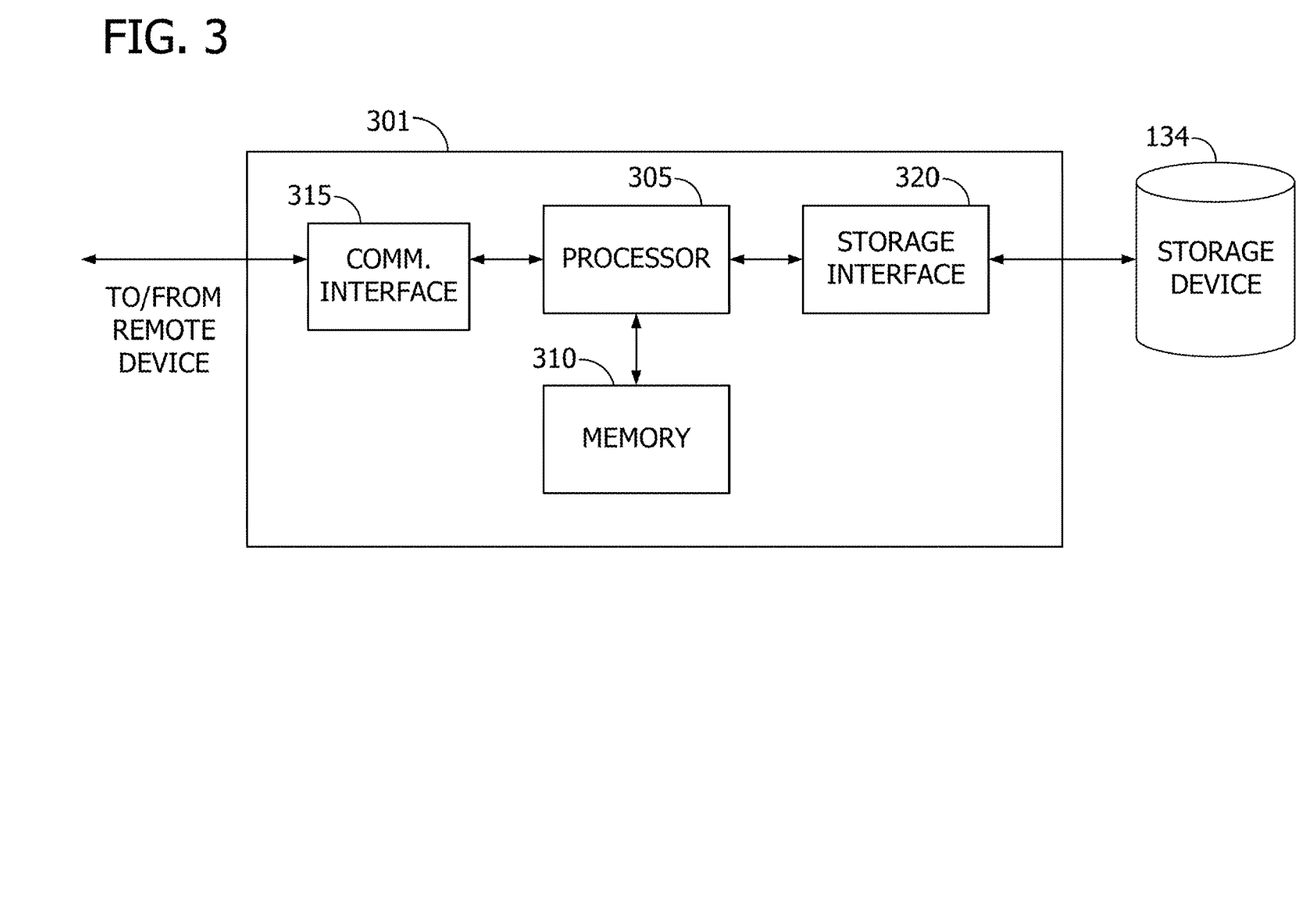
FIG. 3 shows an example configuration of a server system, such as the FE platform configured to establish filesystem-based application networking for remote computer applications.

FIG. 3 illustrates an example configuration of a server system 301 such as FE platform 112 (shown in FIG. 1). Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. More specifically, the instructions may cause various data manipulations on data stored in storage 134 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.). Processor 305 is operatively coupled to a communication interface 315 such that server system 301 is capable of communicating with a remote device such as a computer device or another server system 301.

Processor 305 may also be operatively coupled to a storage device 134. Storage device 134 is any computer-operated hardware suitable for storing and/or retrieving data. In some embodiments, storage device 134 is integrated in server system 301. In other embodiments, storage device 134 is external to server system 301 and is similar to database 120 (shown in FIG. 2). For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
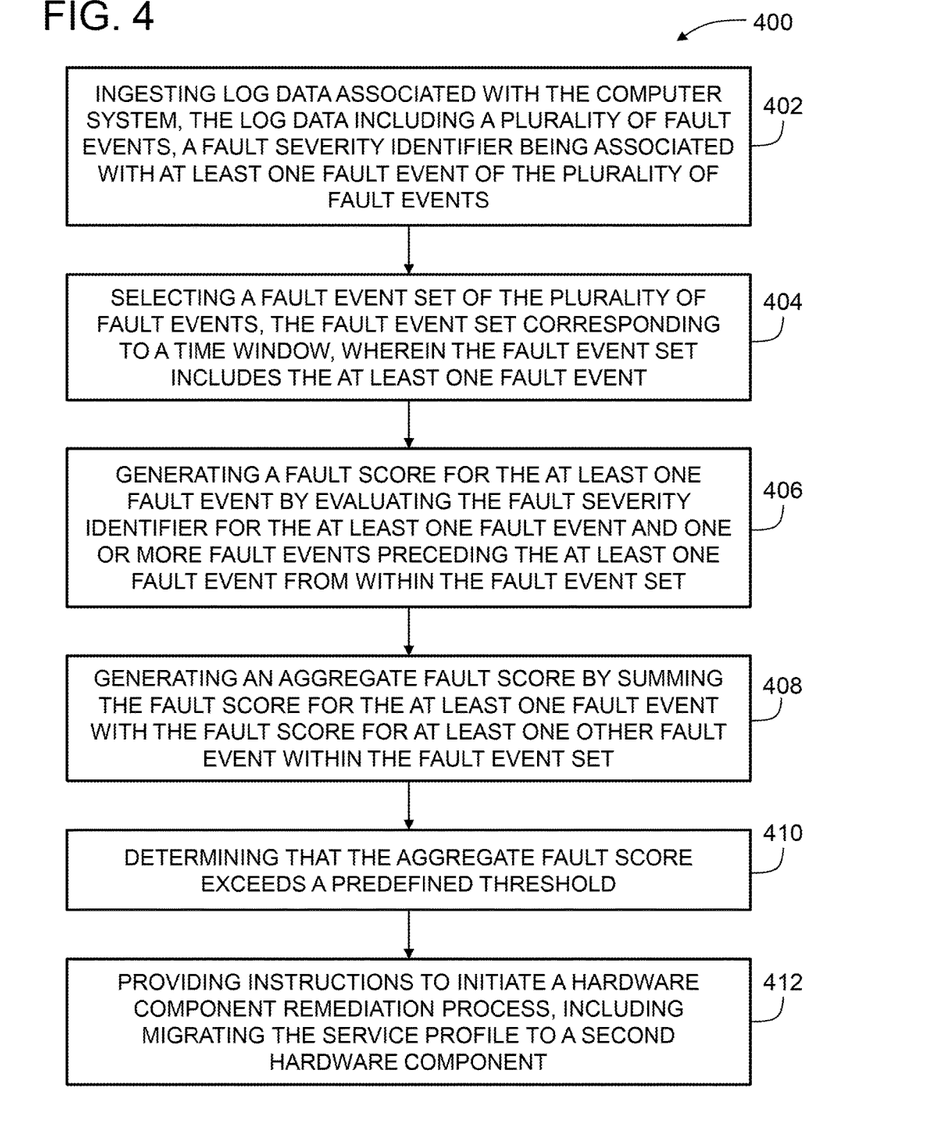
FIG. 4 shows an example method flow illustrating how the FE platform establishes and operates a filesystem-based application network.

FIG. 4 shows an example method flow illustrating how the FE platform analyzes log data in order to generate fault scores for fault events in the log data. In the example embodiment, the FE platform ingests 402 log data associated with a computer system (or component). The log data will include a plurality of fault events. Each fault event has a fault severity identifier associated with it, as described above.

The FE platform selects 404 a fault event set of the plurality of fault events. The fault event set corresponds to a time window that is defined by a user of the FE platform as described above. The FE platform generates 406 a fault score for a fault event in the fault event set. The FE platform generates the fault score by evaluating the fault severity identifier for the fault event and one or more fault events preceding the at least one fault event from within the fault event set. In the example embodiment, the FE platform aggregates all other fault events preceding the fault event and their respective fault severity identifiers. The FE platform generates 408 an aggregate fault score by summing the fault score for the at least one fault event with the fault score for at least one other fault event within the fault event set. The FE platform determines 410 that the aggregate fault score exceeds a predefined threshold. The FE platform initiates 412 a hardware component remediation process, including migrating the service profile to a second hardware component.

Figure 5:
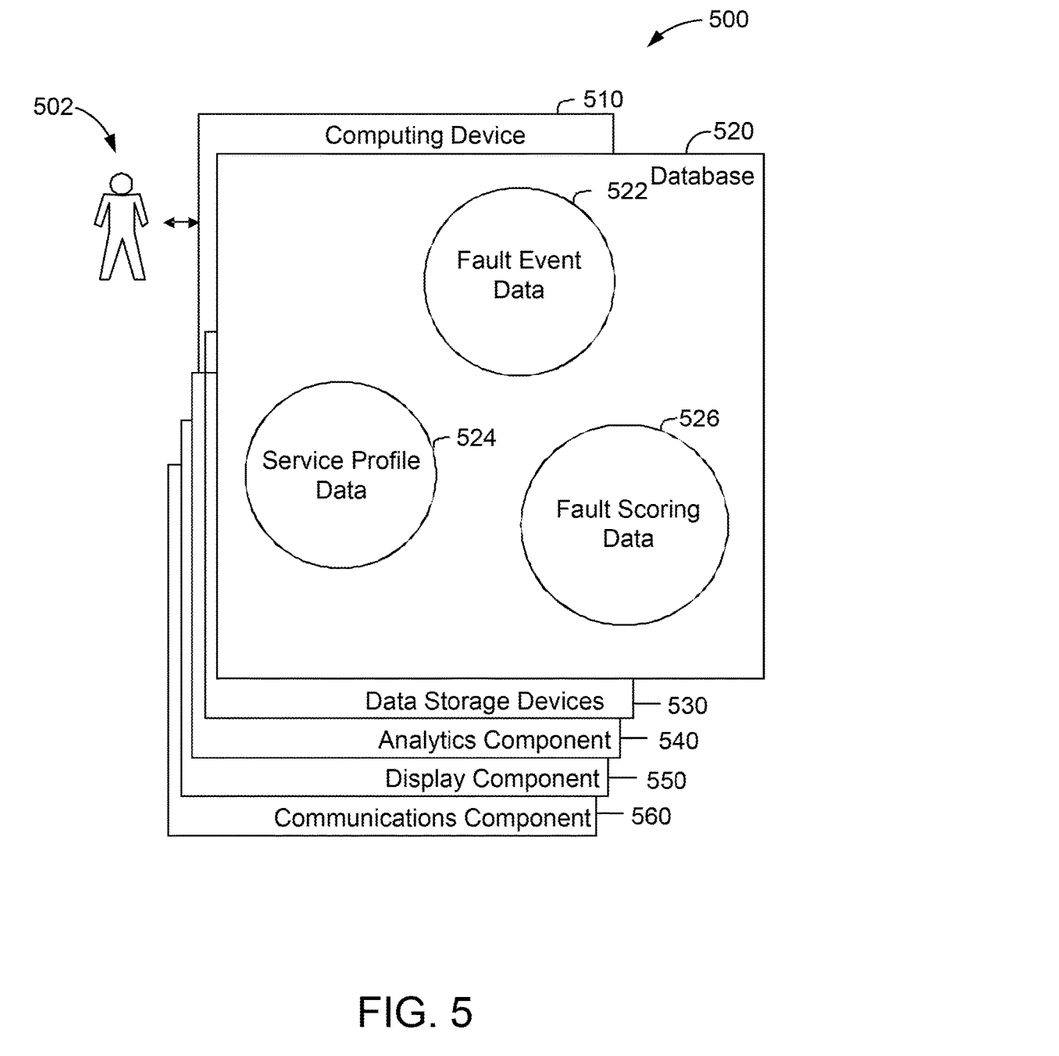
FIG. 5 shows an example configuration of a database within a computer device, along with other related hardware components, that may be used to establish and operate a filesystem-based application network.

FIG. 5 shows an example configuration of a database 500 within a computer device, along with other related hardware components, that may be used to evaluate and score fault events for a component. In some embodiments, computer device 510 is similar to FE platform 112 (shown in FIG. 1). User 502 (such as a user operating FE platform 112) may access computer device 510 in order to transmit threshold value and time interval data, as well as observing fault scores for components in order to drive remediation processing. In some embodiments, database 520 is similar to storage device 134 (shown in FIG. 3). In the example embodiment, database 520 includes fault event data 522, service profile data 524, and fault scoring data 526. Fault event data 522 includes data regarding fault events on one or more components, associated fault severity identifiers, fault event timestamps, or the like.

Service profile data 524 includes component definition data, identity data, firmware revision data, connectivity definition data, and the like. Component definition may include, in the case of a hardware component, data regarding the hardware component model, compatible components, performance data, and the like. Identity data includes specific identifiers for the component such as universally unique identifier(s) (UUID), media access control (MAC) address, world-wide name (WWN) data, and the like. Firmware revision data includes data regarding the current firmware version for the component, revision schedules, and the like. Connectivity definition data is usable to configure network adapters, interconnecting components, and the like. Fault scoring data 526 includes algorithms used to perform fault scoring, fault scores for individual fault events as well as individual components, or the like. Fault scoring data 526 may also include data generated by statistical analysis that analyzes the most common types of faults and the most commonly affected components.

Computer device 510 also includes data storage devices 530. Computer device 510 also includes analytics component 540 that processes incoming fault event data and generates fault scores. Computer device 510 also includes display component 550 that can be used by user 502 to view fault events and generated fault event scores. Computer device 510 also includes communications component 560 which is used to communicate with remote computer devices such as affected components and AT platform 116 (shown in FIG. 1). In one embodiment, communications component 560 is similar to communications interface driver 315 (shown in FIG. 1).

As will be appreciated based on the foregoing specification, the above-described embodiments of the disclosure may be implemented using computer programming or engineering techniques including computer software, firmware, hardware or any combination or subset thereof, wherein the technical effect is to establish and operate a filesystem-based application network. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of real-time computer fault evaluation for a computer system, the method implemented using a fault evaluation (FE) platform, the FE platform being communicatively coupled to a configuration management platform and a first plurality of hardware components each having an associated service profile and at least one functionality, the method comprising:

ingesting, by the FE platform, log data associated with the computer system, the log data including a plurality of fault events, a fault severity identifier being associated with at least one fault event of the plurality of fault events, each of the plurality of fault events associated with at least one of the plurality of hardware components of the computer system;

selecting, by the FE platform, a fault event set of the plurality of fault events, the fault event set corresponding to a time window and a first hardware component of the plurality of hardware components, wherein the fault event set includes the at least one fault event;

generating, by the FE platform, a fault score for the at least one fault event by evaluating the service profile of the first hardware component, the fault severity identifier for the at least one fault event, and one or more fault events preceding the at least one fault event from within the fault event set, wherein the service profile of the first hardware component includes a service profile identifier and data associated with a configuration of the first hardware component;

generating, by the FE platform, an aggregate fault score by summing the fault score for the at least one fault event with the fault score for at least one other fault event within the fault event set;

determining, by the FE platform, that the aggregate fault score exceeds a predefined threshold;

providing, by the FE platform to the configuration management platform, instructions to initiate a hardware component remediation process; and migrating, by the configuration management platform using the service profile identifier, the service profile of the first hardware component to a second hardware component, the service profile of the first hardware component downloaded by the configuration management platform from a service profile repository.

2. A method in accordance with claim 1, wherein the plurality of fault events represents one or more computer faults occurring on the first hardware component.

3. A method in accordance with claim 1, further comprising identifying, by the configuration management platform in communication with the FE platform, the second hardware component, including determining that the second hardware component has the at least one functionality, wherein the second hardware component shares a computer network with the first hardware component.

4. A method in accordance with claim 1, further comprising:
identifying a value for the fault severity identifier for the at least one fault event; and
multiplying the value with a sum of values for the one or more fault events preceding the at least one fault event.

5. A method in accordance with claim 1, further comprising:
updating the fault severity identifier based, at least in part, on one or more metadata associated with the first hardware component.

6. A method in accordance with claim 1, wherein the service profile represents one or more configuration elements for configuring the hardware component.

7. A system for real-time computer fault evaluation for a computer system, the system comprising:
a fault evaluation (FE) platform and a configuration management platform, the FE platform being communicatively coupled to a plurality of hardware components each having an associated service profile and at least one functionality, the FE platform configured to:
ingest log data associated with the computer system, the log data including a plurality of fault events, a fault severity identifier being associated with at least one fault event of the plurality of fault events, each of the plurality of fault events associated with at least one of the plurality of hardware components of the computer system;
select a fault event set of the plurality of fault events, the fault event set corresponding to a time window and a first hardware component of the plurality of hardware components, wherein the fault event set includes the at least one fault event;

generate a fault score for the at least one fault event by evaluating the service profile of the first hardware component, the fault severity identifier for the at least one fault event and one or more fault events preceding the at least one fault event from within the fault event set, wherein the service profile of the first hardware component includes a service profile identifier and data associated with a configuration of the first hardware component;

generate an aggregate fault score by summing the fault score for the at least one fault event with the fault score for at least one other fault event within the fault event set;

determine that the aggregate fault score exceeds a predefined threshold;

provide, to the configuration management platform, instructions to initiate a hardware component remediation process; and the configuration management platform being configured to migrate, using the service profile identifier, the service profile of the first hardware component to a second hardware component, the service profile of the first hardware component downloaded by the configuration management platform from a service profile repository.

8. A system in accordance with claim 7, wherein the plurality of fault events represents one or more computer faults occurring on the first hardware component.

9. A system in accordance with claim 7, wherein the configuration management platform in communication with the FE platform is further configured to identify the second hardware component, including determining that the second hardware component has the at least one functionality, wherein the second hardware component shares a computer network with the first hardware component.

10. A system in accordance with claim 7, wherein the FE platform is further configured to:
identify a value for the fault severity identifier for the at least one fault event; and
multiply the value with a sum of values for the one or more fault events preceding the at least one fault event.

11. A system in accordance with claim 7, wherein the FE platform is further configured to:
update the fault severity identifier based, at least in part, on one or more metadata associated with the first hardware component.

12. A non-transitory computer readable medium that includes a first set of computer-executable instructions for execution by a fault evaluation (FE) platform comprising a processor, and a second set of computer-executable instructions for execution by a configuration management platform, the FE platform being communicatively coupled to a plurality of hardware components each having an associated service profile and at least one functionality, wherein:
when executed by the FE platform, the first set of computer-executable instructions cause the FE platform to:
ingest log data associated with the computer system, the log data including a plurality of fault events, a fault severity identifier being associated with at least one fault event of the plurality of fault events, each of the plurality of fault events associated with at least one of the plurality of hardware components;
select a fault event set of the plurality of fault events, the fault event set corresponding to a time window and a first hardware component of the plurality of hardware components, wherein the fault event set includes the at least one fault event;

generate a fault score for the at least one fault event by evaluating the service profile of the first hardware component, the fault severity identifier for the at least one fault event and one or more fault events preceding the at least one fault event from within the fault event set, wherein the service profile of the first hardware component includes a service profile identifier and data associated with a configuration of the first hardware component;

generate an aggregate fault score by summing the fault score for the at least one fault event with the fault score for at least one other fault event within the fault event set;

determine that the aggregate fault score exceeds a predefined threshold;

provide, to the configuration management platform, instructions to initiate a hardware component remediation process; and wherein when executed by the configuration management platform, the second set of computer-executable instructions cause the configuration management platform to:

migrate, using the service profile identifier, the service profile of the first hardware component to a second hardware component, the service profile of the first hardware component downloaded by the configuration management platform from a service profile repository.

13. A non-transitory computer readable medium in accordance with claim 12, wherein the plurality of fault events represents one or more computer faults occurring on the first hardware component.

14. A non-transitory computer readable medium in accordance with claim 12, wherein the second set of computer-executable instructions further cause the configuration management platform to identify the second hardware component, including determining that the second hardware component has the at least one functionality, wherein the second hardware component shares a computer network with the first hardware component.

15. A non-transitory computer readable medium in accordance with claim 12, wherein the first set of computer-executable instructions further cause the FE platform to:
 identify a value for the fault severity identifier for the at least one fault event; and
 multiply the value with a sum of values for the one or more fault events preceding the at least one fault event.

16. A non-transitory computer readable medium in accordance with claim 12, wherein the first set of computer-executable instructions further cause the FE platform to:
 update the fault severity identifier based, at least in part, on one or more metadata associated with the first hardware component.

17. A non-transitory computer readable medium in accordance with claim 12, wherein the service profile represents one or more configuration elements for configuring the hardware component.

\* \* \* \* \*

UNITED STATES PATENT AND TRADEMARK OFFICE
CERTIFICATE OF CORRECTION

PATENT NO. : 10,331,507 B2  
APPLICATION NO. : 15/387171  
DATED : June 25, 2019  
INVENTOR(S) : Aaron Braundmeier et al.

Page 1 of 1

It is certified that error appears in the above-identified patent and that said Letters Patent is hereby corrected as shown below:

In the Claims

In Claim 1, Column 12, Line 56, delete "and a first plurality of" and insert therefor -- and a plurality of --.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*